(12) United States Patent
Quero et al.

(10) Patent No.: US 11,661,815 B1
(45) Date of Patent: May 30, 2023

(54) RESINS FOR REPAIR OF WELL INTEGRITY ISSUES

(71) Applicant: Halliburton Energy Services, Inc., Houston, TX (US)

(72) Inventors: Philippe Quero, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/833,494

(22) Filed: Jun. 6, 2022

(51) Int. Cl.
| | | |
|---|---|---|
| *E21B 33/12* | (2006.01) | |
| *E21B 33/138* | (2006.01) | |
| *C09K 8/44* | (2006.01) | |
| *C09K 8/42* | (2006.01) | |

(52) U.S. Cl.
CPC ............ *E21B 33/138* (2013.01); *C09K 8/428* (2013.01); *C09K 8/44* (2013.01); *E21B 33/12* (2013.01)

(58) Field of Classification Search
None
See application file for complete search history.

(56) References Cited

U.S. PATENT DOCUMENTS

| | | | |
|---|---|---|---|
| 5,159,980 A | 11/1992 | Onan et al. | |
| 5,712,314 A | 1/1998 | Surles et al. | |
| 6,006,836 A | 12/1999 | Chatterji et al. | |
| 6,271,181 B1 | 8/2001 | Chatterji et al. | |
| 6,321,841 B1 | 11/2001 | Eoff et al. | |
| 7,308,936 B2 | 12/2007 | Sweatman et al. | |
| 7,311,147 B2 | 12/2007 | Sweatman et al. | |
| 7,662,755 B2 | 2/2010 | Reddy et al. | |
| 7,762,329 B1 | 7/2010 | Morgan et al. | |
| 8,066,073 B2 | 11/2011 | Hutchins et al. | |
| 8,524,320 B1 | 9/2013 | Gillanders et al. | |

(Continued)

FOREIGN PATENT DOCUMENTS

| | | |
|---|---|---|
| EP | 2251524 A1 | 11/2010 |
| WO | 2021066642 A1 | 4/2021 |

OTHER PUBLICATIONS

Mi, Ahmed; Morsy, Ahmed; Bhaisora, Devesh; Ahmed, Mahmoud (). [Society of Petroleum Engineers Abu Dhabi International Petroleum Exhibition & Conference—Abu Dhabi, UAE (Nov. 7, 2016)] Abu Dhabi International Petroleum Exhibition & Conference—Resin Sealant System Solved Liner Hanger Assembly Leakage and Restored Well Integrity: Case History from Western Desert.

(Continued)

*Primary Examiner* — Andrew Sue-Ako
(74) *Attorney, Agent, or Firm* — Thomas Rooney; C. Tumey Law Group PLLC

(57) ABSTRACT

The present disclosure may relate to a method of remediating a wellbore. The method may comprise pumping a resin treatment fluid from a surface location to an annular space bounded by an outer diameter of a production tubular, wherein the resin treatment fluid comprises a liquid hardenable resin, a hardening agent, and a particulate bridging agent. The resin treatment fluid may gravity settle in the annular space to contact production equipment in the annular space such that at least a portion of the particulate bridging agent bridges across one or more damaged sections of the production equipment, wherein at least a portion of the liquid hardenable resin sets to form a hardened mass to seal the one or more damaged sections.

20 Claims, 2 Drawing Sheets

(56) References Cited

U.S. PATENT DOCUMENTS

| | | | |
|---|---|---|---|
| 8,960,312 | B2 | 2/2015 | Mebratu |
| 9,724,730 | B2 | 8/2017 | Gillanders et al. |
| 9,889,469 | B2 | 2/2018 | Gillanders et al. |
| 11,155,744 | B2 | 10/2021 | Blue et al. |
| 2008/0135251 | A1* | 6/2008 | Nguyen ............... C09K 8/426 166/295 |
| 2010/0004146 | A1 | 1/2010 | Panga et al. |
| 2014/0060831 | A1 | 3/2014 | Miller |
| 2014/0367105 | A1* | 12/2014 | Karcher ............... C09K 8/44 166/295 |
| 2020/0024503 | A1 | 1/2020 | Watters et al. |
| 2021/0003320 | A1 | 1/2021 | Toews et al. |
| 2021/0054697 | A1* | 2/2021 | Dokhon ............... E21B 34/06 |
| 2021/0079286 | A1* | 3/2021 | Escobar ............... C04B 26/28 |
| 2022/0073807 | A1* | 3/2022 | Wagle ............... C09K 8/428 |

OTHER PUBLICATIONS

Sanabria, A. E.; Knudsen, K.; Leon, G. A. (). [Society of Petroleum Engineers Abu Dhabi International Petroleum Exhibition & Conference—Abu Dhabi, UAE (Nov. 7, 2016)] Abu Dhabi International Petroleum Exhibition & Conference—Thermal Activated Resin to Repair Casing Leaks in the Middle East.

Hathcock, Larry; Gardner, Craig; Herbert, Paul; Hoss, Richard; King, Lee; Norman, David (). [Society of Petroleum Engineers SPE Annual Technical Conference and Exhibition—Dallas, Texas (Oct. 22, 1995)] SPE Annual Technical Conference and Exhibition—Innovative Through-tubing Workover Process Utilizing a Cement Packer.

Jones, P. J.; Karcher, J.; Ruch, A.; Beamer, A.; Smit, P.; Hines, S.; Olson, M. R.; Day, D. (). [Society of Petroleum Engineers SPE/EAGE European Unconventional Resources Conference and Exhibition—Vienna, Austria (Feb. 25, 2014)] SPE/EAGE European Unconventional Resources Conference and Exhibition—Rigless Operation to Restore Wellbore Integrity using Synthetic-based Resin Sealants.

Singh, Pratyush; Al-Yami, Abdullah; Wagle, Vikrant; Safran, Ali (). [Society of Petroleum Engineers SPE Oil and Gas India Conference and Exhibition—Mumbai, India (Apr. 8, 2019)] SPE Oil and Gas India Conference and Exhibition—Introduction to an Effective Workover Method to Repair Casing Leak.

Rashid, Kamran; Ahmed, Hassaan; Ahmad, Muneeb; Ali, Syed Dost; Khan, M. Noman; Anjum, Asif Mehmood (). [Society of Petroleum Engineers SPE/PAPG Pakistan Section Annual Technical Symposium and Exhibition—Islamabad, Pakistan (Nov. 18, 2019)] SPE/PAPG Pakistan Section Annual Technical Symposium and Exhibition—Successful Implementation of Resin Based Isolation Plug RBIP in Annulus to Restore Lost Well Integrity. A Case Study from South of Pakistan.

Carpenter, Chris (2019). Microchannel Remediation of a Cement Packer Unlocks Mature-Field Potential. Journal of Petroleum Technology, 71(1), 56-57.

Alkhamis, Mohammed; Imqam, Abdulmohsin; Milad, Muhend (). [Society of Petroleum Engineers SPE Symposium: Decommissioning and Abandonment—Kuala Lumpur, Malaysia (Dec. 2, 2019)] SPE Symposium: Decommissioning and Abandonment—Evaluation of an Ultra-High Performance Epoxy Resin Sealant for Wellbore Integrity Applications.

* cited by examiner

RESINS FOR REPAIR OF WELL INTEGRITY ISSUES

BACKGROUND

Wellbores may be utilized to access and produce subterranean deposits of hydrocarbons. During wellbore construction, permanent tubular strings may be utilized to, among other things, keep the wellbore from collapsing and provide isolation between the subterranean geologic layers and the surface of the earth. These permanent tubulars may be referred to as casing. In addition to the permanent casing, wellbores may include production equipment which may or may not be permanent. Some non-limiting examples of production equipment may include production tubing, production packers, and tubing anchors. When reservoir fluids enter a wellbore from a subterranean formation, the production tubing may function as a conduit to relay the fluids from a subterranean location in the wellbore to the surface of the earth. Production tubing may either be disposed inside a string of casing, inside an uncased wellbore interval, or may traverse both sections of wellbore that are cased as well as uncased. Regardless of the casing configuration, when a production tubing is disposed within a wellbore, an annular section will exist between the outer diameter of the production tubing and the inner diameter of either the casing or the diameter of the wellbore. In some scenarios, it may be desirable to use a production packer on the external portion of the tubing to isolate the annular space above and below the packer.

In some scenarios, wellbores and the associated production equipment are exposed to caustic or deleterious formation fluids or operating conditions which may result in damage to the wellbore equipment. Additionally, wear and tear from standard operating conditions over an extended period of time may also result in damaged wellbore equipment. Such deleterious production conditions may result in leaking packers and leaking production tubing which may further result in reduced or lost production. It is common within the industry to perform what may be known as a "workover," to remediate such production issues. A workover operation may typically include utilizing a workover rig to remove the production equipment from the wellbore in order to inspect, identify, and replace the damaged components or portions of the equipment. Prior to performing a workover operation, a technical specialist such as a production engineer, may review a wellbore diagram or previous workover reports which provide specific details related to the state and installation of the production equipment. Reviewing such materials may prevent unforeseen issues which if not planned for, may result in irreversible well damage. In some scenarios, older wells and/or wells that have transferred in ownership from one company to another company may not have adequate wellbore diagrams or workover reports to understand the state of the wellbore equipment. As such, in some scenarios it may be desirable to resolve potential issues such as production tubing and packer leaks with a rig-less intervention that is minimally invasive and requires minimal equipment.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
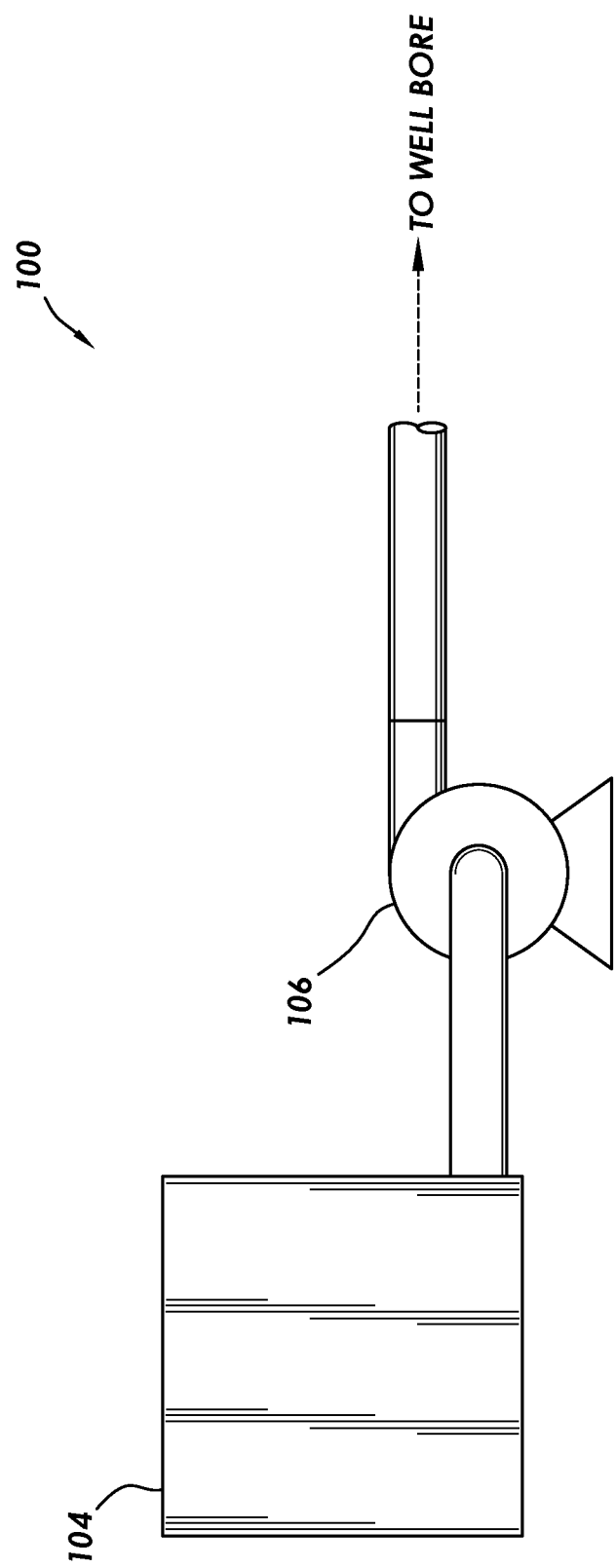
FIG. 1 is a schematic illustration of an example system for the preparation and delivery of a resin treatment fluid into a wellbore.

The present disclosure may relate to sealing leaks in production wells and, more specifically, embodiments relate to use of resin treatment fluids containing one or more particulate bridging agents to seal leaks in production wells.

Resin treatment fluids may include a liquid hardenable resin, a hardening agent, and a particulate bridging agent. Additionally, resin treatment fluids may include solvents, surfactants, and silane coupling agents. The resin treatment fluid may be introduced into a wellbore and allowed to set to form a hardened mass. In some examples, the hardened mass may function to provide remediation of well integrity issues. For example, the hardened mass may provide isolation to damaged or leaking production equipment that is disposed in the annulus between the production tubulars and the uncased wellbore wall or inner diameter of the casing. Examples of such production equipment may include production tubulars, production packers, sliding sleeves, tubular couplings, tubular crossovers, gas lift mandrels, perforations, and seating nipples or profiles. Prior to the resin treatment fluid forming a hardened mass, the particulate bridging agents incorporated in the fluid may function to pack-off leaks and/or failure points in production equipment. In doing so, the particulate bridging agents may be beneficial in achieving proper placement and sealing of the resin treatment fluid. The particulate bridging agents may create a filter against which the liquid hardenable resin may accumulate to form a seal resulting in the remediation of damaged portions of the production equipment.

Liquid hardenable resins generally may include any of a number of physically similar polymerized synthetics or chemically modified natural resins including thermoplastic materials and thermosetting materials. In some examples, suitable liquid hardenable resins include epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, diglycidyl ether bisphenol F resin, cyclohexane dimethanol diglycidyl ether, glycidyl ether resins, polyester resins and hybrids and copolymers thereof, polyurethane resins and hybrids and copolymers thereof, acrylate resins, and mixtures thereof. Some suitable liquid hardenable resins, such as epoxy resins, may be cured with an internal hardening agent (e.g.: internal catalyst or activator) so that when pumped downhole, they may be cured using only time and temperature. Other suitable liquid hardenable resins, such as furan resins generally require a time-delayed hardening agent or an external hardening agent to help activate the polymerization of the resins if the cure temperature is low (i.e., less than 250° F. (121° C.), but will cure under the effect of time and temperature if the formation temperature is above about 250° F. In some examples a hydrolysable ester may be converted into an to activate a furan-based resin.

Selection of a particular liquid hardenable resins resin may be affected by the temperature of the subterranean formation to which the resin treatment fluid will be introduced. By way of example, for subterranean formations having a bottom hole static temperature ("BHST") ranging from about 60° F. to about 400° F. (15° C. to 205° C.), two-component epoxy-based resin systems comprising a liquid hardenable resin and a hardening agent may be used. Generally, the liquid hardenable resin may be included in the resin treatment fluid in an amount in a range of from about 5% to about 70% by volume of the resin treatment fluid. In some examples, the liquid hardenable resin may be included in the resin treatment fluid in an amount of about 25% to about 70% by volume of the resin treatment fluid. In some examples, the liquid hardenable resin may be included in the resin treatment fluid in an amount of about 75% to about 98% by volume of the resin treatment fluid or from about 90% to about 98% by volume of the resin treatment fluid. In some embodiments, the liquid hardenable resins may be included in the resin treatment fluids in an amount of about 5% to about 10%, about 10% to about 20%, about 20% to about 30%, about 30% to about 40%, about 40% to about 50%, about 50% to about 70% by volume of the resin treatment fluid. Alternatively, from about 50% to about 55% by volume, about 55% to about 60% by volume, about 60% to about 65% by volume, about 65% to about 70% by volume, or any ranges therebetween.

The hardening agents generally may include any substance capable of transforming the liquid hardenable resin into a hardened, consolidated mass. In general, hardening agents typically transform the liquid hardenable resin to a hardened mass by way of a crosslinking reaction commonly referred to as curing. Hardening agents may also be referred to as "hardeners," "accelerators," "catalysts," "activators," "curing agents," and "curatives." Examples of suitable hardening agents may include aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. Examples of commercially available hardening agents may include combinations of hardeners such as 75%-81% 3,5-diethyltoluene-2,4-diamine, 18%-20% 3,5-diethyltoluene-2,6-diamine, and 0.5%-3% dialkylated m-phenylenediamines. In some embodiments the hardening agent may comprise a mixture of hardening agents selected to impart particular qualities to the resin treatment fluid. In some embodiments, the hardening agents may be included in the resin treatment fluid in an amount of from about 1% to about 50% by volume of the resin treatment fluid. Alternatively, from about 1% to about 10% by volume, about 10% to about 20% by volume, about 20% to about 30% by volume, about 40% to about 50% by volume, or any ranges therebetween. In other examples, a time-delayed activator such as hydrolyzable esters or sulfonated esters may be utilized. Examples of hydrolyzable esters may include formate ester; a diethylene glycol diformate; an ethyl lactate; a methyl lactate; a butyl lactate; an acetate ester; an ethylene glycol monoformate; a dimethylglutarate; a dimethyladipate; a dimethylsuccinate; a sorbitol; a catechol; a dimethylthiolate; a methyl salicylate; a dimethyl salicylate; a ter-butylhydroperoxide; any derivate thereof; and any combination thereof. Examples of sulfonated esters may include methyl p-toluenesulfonate; an ethyl p-toluenesulfonate; a methyl o-toluenesulfonate; an ethyl o-toluenesulfonate; a methyl m-toluenesulfonate; an ethyl m-toluenesulfonate; a methyl methanesulfonate; an ethyl methanesulfonate; an any combinations thereof.

As mentioned above, the resin treatment fluid may include one or more particulate bridging agent which may pack-off against a leaking or damaged portion of the production equipment. The particulate bridging agents may comprise relatively inert solids or hard materials which may be either ridged or flexible. The particulate bridging agents may comprise any regular or irregular geometry such as, for example, flakes, toroids, pellets, beads, spheres, fibers, rods, platelets, disks, plates, ribbons, or cubes, for example.

Some example particulate bridging agents include natural or synthetic particles or fibers and mixtures thereof. Specific examples of materials for the particulate bridging agents may include sand, silica, alumina, fumed carbon, carbon black, graphite, mica, titanium dioxide, meta-silicate, calcium silicate, kaolin, talc, zirconia, boron, fly ash, shale, ground marble, bauxite, ceramic materials, glass materials, metal pellets, high strength synthetic fibers, cellulose flakes, wood, polytetrafluoroethylene materials, nut shell pieces, cured resinous particulates, seed shell pieces, fruit pit pieces, composite particulates, hollow microspheres, silica and alumina cenospheres, hollow glass microspheres, ceramic microspheres, polymeric microspheres, plastic microspheres, ilmenite, barite, Portland cement, crystalline hematite, aluminum oxide, awaruite, barium carbonate, barium oxide, calcium carbonate, calcium oxide, chromite, chromium oxide, copper, copper oxide, dolomite, galena, gold, hematite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, pumice, pyrite, scheelite, silver, tenorite, titania, titanium (II) oxide, titanium (III) oxide, zirconium oxide, zirconium silicate, zinc oxide and any combination thereof. Suitable composite particulates may include a binder and a filler material, wherein suitable filler materials may include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. In some examples, the materials used for the particulate bridging agent may comprise two or more of the foregoing materials.

The particulate bridging agents may pack-off or bridge around the leaking or damaged production equipment to form a seal-like filter which may help prevent the liquid hardenable resin from seeping past the area of interest thereby aiding in the placement and retention of the liquid hardenable resin. In some examples, the particulate bridging agents may form a seal-like filter wherein the liquid hardenable resin may partially seep into a portion of the interstitial space created by the voids between the particulate bridging agents. In some examples, particulate bridging agents which comprise a range of particle sizes may create a more conducive filter for placement and retention of the liquid hardenable resin. As such, the conglomeration of particulate bridging agents may comprise more than one average particle size for the particulate bridging agents such that they function synergistically with each other in bridging and packing-off leaks in a portion of the production equipment. For example, selection of the particle size of the particulate bridging agent may enable the bridging agent to function over a wide range of leak sizes.

As referenced herein, the particle size distribution ("PSD") of a powder, granular material or particles dispersed in fluid, is a list of values or a mathematical function that defines the relative amount, typically by mass, of particles present according to size. Generally, PSD may be defined by the method by which it is determined. A commonly used method of determination is sieve analysis, wherein particles are separated on sieves of different sizes. Sieve analysis presents particle size information in the form of an S-curve of cumulative mass retained on each sieve versus the sieve mesh size. Thus, the PSD may be defined in terms of discrete size ranges. The PSD may be determined over a list of size ranges that cover nearly all the sizes present in a particular sample. Some methods of determination allow much narrower size ranges to be defined than can be obtained by use of sieves and may be applicable to particle sizes outside of the range available in sieves. Moreover, as further disclosed herein, commonly used metrics for describing PSD are D-Values (D10, D50 & D90) which are the intercepts for 10%, 50% and 90% of the cumulative mass. For example, the D10 is the diameter at which 10% of the sample's mass is particles with a diameter less than this value. The D50 is the diameter of the particle that 50% of a sample's mass is particles with a diameter less than this value. The D90 is the diameter at which 90% of the sample's mass is particles with a diameter less than this value. Further, the PSD may be expressed as a "range" analysis, in which the amount in each size range may be listed in order. The particulate bridging agents may comprise any average particle size for a particulate application. For example, the particulate bridging agents may have a D90 of about 1 micron to about 2000 microns. By way of further example, the particulate bridging agents may have a D90 of about 10 microns to about 200 microns. Alternatively, the solid particles may have a D90 in the range of about 10 microns to about 20 microns, about 20 microns to about 30 microns, about 30 microns to about 40 microns, about 40 microns to about 50 microns, about 50 microns to about 60 microns, about 60 microns to about 70 microns, about 70 microns to about 80 microns, about 80 microns to about 90 microns, about 90 microns to about 100 microns, about 100 microns to about 110 microns, about 110 microns to about 120 microns, about 120 microns to about 130 microns, about 130 microns to about 140 microns, about 140 microns to about 150 microns, about 150 microns to about 160 micron, about 160 microns to about 170 microns, about 170 microns to about 180 microns, about 180 microns to about 190 microns, about 190 microns to about 200 microns, about 200 microns to about 300 microns, about 300 microns to about 400 microns, about 400 microns to about 500 microns, about 500 microns to about 600 microns, about 600 microns to about 700 microns, about 700 microns to about 800 microns, about 800 microns to about 900 microns, about 900 microns to about 1000 microns, about 1000 microns to about 1500 microns, about 1500 microns to about 2000 microns, and any combination thereof. In some examples the average size distribution may be unimodal, bi-modal, or tri-modal. In other examples, the average size distribution may be multimodal such that it is greater than tri-modal. By way of analysis, the multimodal particle size distribution results in multiple modal peaks. Generally, a multimodal distribution may be a continuous probability distribution with two or more modes. For example, the particulate bridging agents may have from about 2 up to about 20 or more modal peaks. Alternatively, the particulate bridging agents may have from about 2 to about 20 or more modal peaks, from about 4 to about 18 or more modal peaks, from about 6 to about 16 or more modal peaks, from about 8 to about 14 or more modal peaks, or from about 10 to about 12 or more modal peaks. Modal peaks occur on a particle size distribution curve when there are increased particle concentrations relative to particle sizes on either side of the curve. One of ordinary skill in the art, with the benefit of this disclosure, should be able to select an appropriate particle size for the particulate bridging agents for a particular application.

In some examples, a solvent may be included in the resin treatment fluid to reduce its viscosity for ease of handling, mixing and transferring. Generally, any solvent that is compatible with the liquid hardenable resin and that achieves the desired viscosity effect may be suitable for use in the liquid hardenable resin component of the resin treatment fluid. Suitable solvents may include polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and combinations thereof. Aqueous solvents may also be used. Selection of an appropriate solvent may be dependent on the hardenable resin chosen. In some examples, the amount of the solvent used in the resin treatment fluid may be in the range of about 0.1% to about 30% by volume of the resin treatment fluid. Alternatively, the solvent may be present in an amount of about 0.1% to about 10%, about 10% to about 20%, or about 20% to about 30% by volume of the resin treatment fluid. Where used, the solvent may be provided with the liquid hardenable resin or may be separately added to the resin treatment fluid. Alternatively, the liquid hardenable resin may be heated to reduce its viscosity, in place of, or in addition to, using a solvent.

The resin treatment fluid may further include a silane coupling agent. The silane coupling agent may be used, among other things, to act as a mediator to help bond the resin to the surface of the subterranean formation, and/or the surface of the wellbore. Examples of suitable silane coupling agents include N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; gamma-glycidoxypropyltrimethoxysilanes; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltrichlorosilane; vinyltris (beta-methoxyethoxy) silane; vinyltrimethoxysilane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-phenyl-r-aminopropyltrimethoxysilane; r-mercaptopropyltrimethoxysilane; r-chloropropyltrimethoxysilane; N[3-(trimethoxysilyl)propyl]-ethylenediamine; substituted silanes where one or more of the substitutions contains a different functional group; and combinations thereof. The silane coupling agent may be provided with the liquid hardenable resin, with the hardening agent, or may be separately added to the resin treatment fluid.

The resin treatment fluid may be utilized in a neat configuration whereby the resin treatment fluid primarily comprises the liquid resin, the hardening agent, the particulate bridging agent, and an optional solvent, if present, without substantial contamination, for example, about less than 5% by volume of other components. In other examples, the resin treatment fluid may further include additional components, such as a cement. A variety of cements may be included in the resin treatment fluid, including cements comprised of calcium, aluminum, silicon, oxygen, and/or sulfur which set and harden by reaction with water. Such hydraulic cements may include Portland cements, pozzolan cements, gypsum cements, high alumina content cements, slag cements, high magnesia content cements, shale cements, acid/base cements, fly ash cements, zeolite cement systems, kiln dust cement systems, microtine cements, metakaolin cements, pumice/lime cements and their combinations. Portland cements that may be suited for use in examples of the present disclosure may be classified as Class A, B, C, D, E, F, G, H, K and L cements according to American Petroleum Institute, API Specification for Materials and Testing for Well Cements, API Specification 10A, Twenty-Fifth Ed., March, 2019. In addition, in some examples, hydraulic cements suitable for use in the present disclosure may be classified as ASTM Type I, II, or III. The cement may be included in the resin treatment fluid in any suitable amount, including, but not limited to, about 0.1% to about 60% by weight of the resin treatment fluid. The cement may be included in the resin treatment fluid in any proportion, such as about 0.1% by weight to about 60% by weight of the resin treatment fluid, or about 0.1% by weight to about 1% by weight, about 1% by weight to about 10% by weight, about 10% by weight to about 20% by weight, about 20% by weight to about 30% by weight, about 30% by weight to about 40% by weight, about 40% by weight to about 50% by weight, about 50% by weight to about 60% by weight, about 60% by weight.

The resin treatment fluid of the present disclosure may be used in the remediation of equipment used to produce reservoir fluids from wellbores. Specifically, the resin treatment fluid may be used when a leak or mechanical failure is present in the annular space between the outer diameter of the production tubulars and the face of the wellbore wall. In some examples, the production tubing may be disposed within a well that is fully cased in which case the face of the wellbore wall may comprise a casing. In other examples, a portion of the wellbore may include an "open-hole," completion wherein at least a portion of the production tubulars may be disposed within a wellbore where the wellbore wall includes the exposed rock face of the formation through which the well was drilled. As used herein, introducing the resin treatment fluid into a subterranean formation includes introduction to the aforementioned annular space. The resin treatment fluid may be pumped or injected directly into the annular space after which it may gravity settle until it bridges-off or packs-off at some location in the annular portion of the wellbore. In some examples, the injection equipment may include a pump which may be fluidically connected to the wellhead to allow the pump to inject the fluid into the annular space. In further examples, the pump may be a small pump with less horsepower or pump rate capacity than a typical cementing pump or hydraulic fracturing pump. In some examples, the small pump may be rated to provide a hydraulic horsepower ("HHP") of about 50 HHP to about 500 HHP. The small pump may be rated for about 50 HHP to about 100 HHP, from about 100 HHP to about 200 HHP, from about 200 HHP to about 300 HHP, about 300 HHP to about 400 HHP, or about 400 HHP to about 500 HHP. In some examples, the pump may be an air, electric, or a diesel driven pump. In some examples, the pump may inject the resin treatment fluid at an injection rate from about 0.1 to about 3 barrels per minute ("bpm"). The resin treatment fluid maybe pumped at any suitable rate including but not limited to, about 0.1 to about 0.5 bpm, about 0.5 to about 1 bpm, about 1 to about 1.5 bpm, about 1.5 to about 2 bpm, about 2 to about 2.5 bpm, about 2.5 to about 3 bpm, about 1 to about 2 bpm, about 2 to about 3 bpm, or about 0.1 to about 2 bpm. In some examples, the resin treatment fluid may be relayed to the annular space without a pump either by pouring or by gravity drainage. In some examples the pump may be delivered to the wellsite location on a truck wherein the pump is disposed on the frame of the truck. In other examples, the pump may be delivered to the wellsite location on a trailer.

FIG. 1 illustrates a system 100 for the preparation of a resin treatment fluid with one or more particulate bridging agents and subsequent delivery of the resin treatment fluid to a wellbore in accordance with certain examples. As shown, the resin treatment fluid may be mixed in mixing equipment 104, such as a jet mixer, re-circulating mixer, or a batch mixer, chemical tote for example, and then pumped via pumping equipment 106 to the wellbore. In some examples the particulate bridging agent may be mixed directly into the container or equipment in which the liquid hardenable resin is transported to the wellsite location. In other examples, the particulate bridging agent may be added by hand to the liquid hardenable resin. In some examples, the mixing equipment 104 and the pumping equipment 106 may be disposed on one or more pump trucks as will be apparent to those of ordinary skill in the art. A resin treatment fluid may be mixed by combing a liquid hardenable resin and a hardening agent in mixing equipment 104 or in other mixing equipment. In some examples, a static mixer may be utilized to mix the required components of the resin treatment fluid. In other examples, the static mixer may allow for 2 or more streams of chemicals to be mixed to form a single stream. Once the resin treatment fluid is prepared, the other additives including the particulate bridging agent may be blended with the resin treatment fluid by slip-streaming the additives with the resin treatment fluid on a suction header on pumping equipment 106. Alternatively, the resin treatment fluid may be blended with the particulate bridging agents in mixing equipment 104. Pumping equipment 106 may pump the resin treatment fluid to the annular space in the wellbore.

Figure 2:
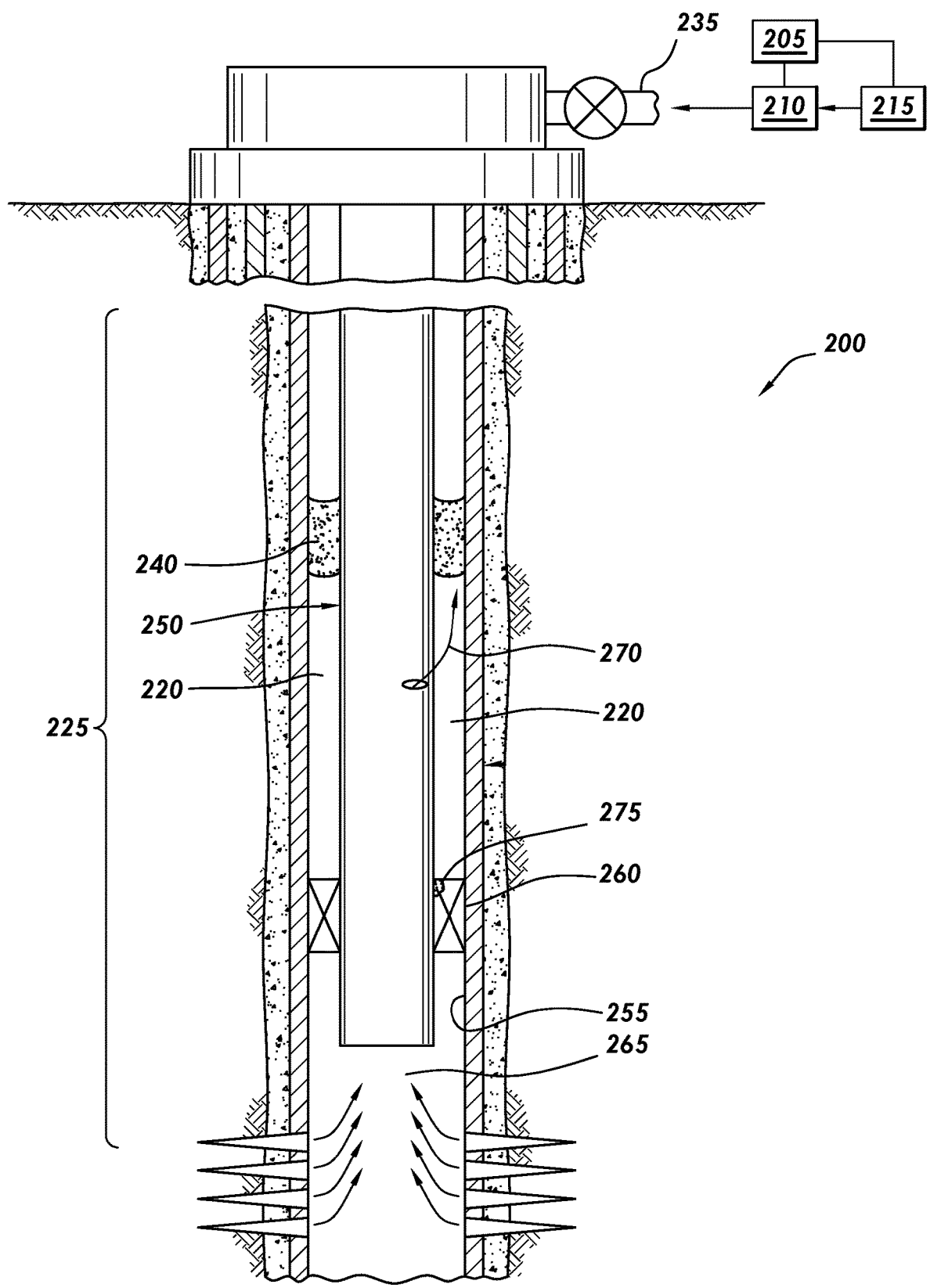
FIG. 2 is a schematic illustration depicting an example application of a resin treatment fluid to remediate tubing and/or packer damage including a partially cross-sectional view of a portion of the wellbore.

An example remediation technique using a resin treatment fluid will now be described with reference to FIG. 2. FIG. 2 illustrates a well system 200 that may undergo remediation operations involving the placement of a resin treatment fluid in accordance with certain examples. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the well system 200 may include surface equipment, including a truck 205, which may be used to deliver pumping equipment 210 (e.g., pumping equipment 106 in FIG. 1) to a wellsite location. In some examples pumping equipment 210 may be mounted on truck 205 while in other examples pumping equipment 210 may merely be loaded onto truck 205. Additional examples include pumping equipment 210 being mounted or loaded onto a trailer (not shown) which may be delivered to location using truck 205. In other examples, well system 200 may include mixing equipment 215 which may additionally be mounted or loaded on truck 205 or mounted or loaded into a trailer which may be delivered to location using truck 205. The particulate bridging agents may be added to the resin treatment fluid using either mixing equipment 215 or by slip-streaming the particulate bridging agents into pumping equipment 210. In some examples the particulate bridging agents may be added into the resin treatment fluid, in other examples the particulate bridging agents may be added into one of the liquid components that creates the resin treatment fluid. In further examples, the particulate bridging agent may be included in a liquid concentrate and may be mixed into the resin treatment fluid or any liquid component of the resin treatment fluid. In some examples, the particulate bridging agent may be pre-mixed into a solitary suspension or may be mixed into a suspension incorporating any components of the resin treatment fluid prior to being delivered to location. In some examples a suspending agent may be used to keep the pre-mixed particulate bridging agents suspended.

Pumping equipment 210, may be fluidically connected to the annular space 220 of wellbore 225 by way of a transfer pipe 235 to allow for the injection of resin treatment fluid 240 into annular space 220. While wellbore 225 may be depicted as vertical well with at least one casing string 245, it should be noted that the remedial application discussed herein may additional be used on uncased wellbores as well as wellbores with sections that are horizontal, slanted, or otherwise deviated from vertical. After pumping equipment 210 has injected resin treatment fluid 240 into annular space 220, the increased density of resin treatment fluid 240 relative to the density of the wellbore fluid in annular space 220 may allow for resin treatment fluid 240 to migrate to a leaking or damaged portion of annular space 220 by gravity displacement or gravity settling. In some examples, the bounds of annular space 220 may comprise the outer diameter of the production tubulars 250, the inner diameter of wellbore wall 255, and a production packer 260 which may isolate annular space 220 from the production flow path 265. In other examples one or more production tubulars 250 may be disposed within the wellbore to create annular space 220 which is bounded by at least the outer diameter of production tubular 250 and the diameter of wellbore walls 255. In further examples, a production packer 260 may be attached to production tubulars 250 and disposed within annular space 220 to isolate annular space 220 from reservoir fluids which may be disposed in production flow path 265. In some non-limiting examples, production packer 260 may be a mechanical packer, a swellable packer, or a pressure-set packer. Under the intended operating conditions in accordance with the described wellbore set-up, production flow path 265 should be isolated from fluidic communication with annular space 220 by production tubulars 250 and production packer 260, as this wellbore equipment are intended to create a pressure and a flow barrier between production flow path 265 and annular space 220. In the event that annular space 220 is not fully isolated from production flow path 265 due to leaks in either or both of production tubulars 250 and production packer 260, production flow path 265 could be conducted up annular space 220 in violation of regional and national safety protocols. The invasion of production flow path 265 into annular space 220 may result in loss of production from wellbore 225. Additionally, failure to isolate annular space 220 from production flow path 265 may result in damage to other components of wellbore system 200. In some examples, production tubulars 250 may include or incur tubular damage 270 in the form of leaks, cracks, fissures, splits, damaged tubular connections, and/or corroded or eroded portions of the tubular. Likewise, in some examples, production packer 260 may include or incur production packer damage 275 which prevents production packer 260 from isolating annular space 220 from production flow path 265. Some examples may include both tubular damage 270 and production packer damage 275.

With continued reference to FIG. 2, a fluid pill or slug of a resin treatment fluid 240 may be pumped in annular space 220. The volume of the resin treatment fluid utilized to remediate a well may vary however in some examples the volume may be less than about 10 barrels ("bbls") of resin treatment fluid. In other examples, the volume of resin treatment fluid used may be less than about 5 bbls. Additional examples may include volumes of resin treatment fluid that range between about 1 bbl and about 2 bbls, about 2 bbls to about 3 bbls, about 3 bbls to about 4 bbls, or about 4 bbls to about 5 bbls. The resin treatment fluid 240 may be allowed settle through a fluid disposed in annular space 220 where the specific gravity of the fluid disposed in annular space 220 is less than that of resin treatment fluid 240 allowing the resin treatment fluid to settle by gravity until it contacts a leak or a damaged portion of either production tubulars 250 or production packer 260. Once the resin treatment fluid contacts a damaged portion of production tubulars 250 or production packer 260, the particulate bridging agents present in the resin treatment fluid 240 may act to bridge or pack-off the damage and assist in the desirable or beneficial placement of the liquid hardenable resin present in resin treatment fluid 240. Once resin treatment fluid 240 has migrated and positioned itself into the desired position in annular space 220, resin treatment fluid 240 may be allowed to set in annular space 220, for example, to form a hardened resin barrier that isolates annular space 220 from production flow path 265. The hardened resin barrier may function to isolate damaged or leaking portions of production tubulars 250, production packer 260, wellbore wall 255 located within annular space 220, or a combination thereof The resin treatment fluid disclosed herein may directly or indirectly affect one or more components or pieces of equipment associated with the preparation, delivery, recapture, recycling, reuse, and/or disposal of the resin treatment fluid. For example, the resin treatment fluid may directly or indirectly affect one or more mixers, related mixing equipment, mud pits, storage facilities or units, composition separators, heat exchangers, agitators, sensors, gauges, pumps, compressors, and the like used generate, store, monitor, regulate, and/or recondition the resin treatment fluid. The resin treatment fluid may also directly or indirectly affect any transport or delivery equipment used to convey the resin treatment fluid to a well site or downhole such as, for example, any transport vessels, conduits, pipelines, trucks, tubulars, and/or pipes used to compositionally move the resin treatment fluid from one location to another, any pumps, compressors, or motors (e.g., topside or downhole) used to drive the resin treatment fluid into motion, any valves or related joints used to regulate the pressure or flow rate of the resin treatment fluid, and any sensors (i.e., pressure and temperature), gauges, and/or combinations thereof, and the like. The disclosed resin treatment fluid may also directly or indirectly affect the various downhole equipment and tools that may come into contact with the resin treatment fluid such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, embodiments relate to use of resin treatment fluids containing particulate bridging agents to seal leaks in production wells. The systems and methods may include any of the various features of the systems and methods disclosed herein, including one or more of the following statements.

Statement 1. A method comprising: pumping a resin treatment fluid from a surface location to an annular space bounded by an outer diameter of a production tubular, wherein the resin treatment fluid comprises a liquid hardenable resin, a hardening agent, and a particulate bridging agent, wherein the resin treatment fluid gravity settles in the annular space to contact production equipment in the annular space such that at least a portion of the particulate bridging agent bridges across one or more damaged sections of the production equipment, and wherein at least a portion of the liquid hardenable resin sets to form a hardened mass to seal the one or more damaged sections.

Statement 2. The method of statement 1, wherein the resin treatment fluid is pumped at an injection rate of about 0.1 to about 2 barrels per minute.

Statement 3. The method of statement 1 or 2, wherein a volume of about 5 bbls or less of the resin treatment fluid is introduced into the annular space.

Statement 4. The method of any of the preceding statements, wherein the resin treatment fluid gravity settles over a period of about 30 minutes to about 2 hours.

Statement 5. The method of any of the preceding statements, wherein the liquid hardenable resin comprises at least one resin selected from the group consisting of an epoxy-based resin, novolak resin, polyepoxide resin, phenol-aldehyde resin, urea-aldehyde resin, urethane resin, phenolic resin, furan resin, furan/furfuryl alcohol resin, phenolic/latex resin, phenol formaldehyde resin, bisphenol A diglycidyl ether resin, butoxymethyl butyl glycidyl ether resin, bisphenol A-epichlorohydrin resin, bisphenol F resin, diglycidyl ether bisphenol F resin, cyclohexane dimethanol diglycidyl ether, glycidyl ether resin, polyester resin and a hybrid and copolymer thereof, polyurethane resin and a hybrid and copolymer thereof, acrylate resin, and any combination thereof Statement 6. The method of any of the preceding statements, wherein the particulate bridging agent comprises at least one particulate material selected from the group consisting of sand, silica, alumina, fumed carbon, carbon black, graphite, mica, titanium dioxide, meta-silicate, calcium silicate, kaolin, talc, zirconia, boron, fly ash, shale, ground marble, bauxite, a ceramic material, a glass material, a metal pellet, a synthetic fiber, a cellulose flake, wood, a polytetrafluoroethylene material, a nut shell piece, a cured resinous particulate, a seed shell piece, a fruit pit piece, a composite particulate, a hollow microsphere, a silica and alumina cenosphere, a hollow glass microsphere, a ceramic microsphere, a polymeric microsphere, a plastic microsphere, ilmenite, barite, Portland cement, crystalline hematite, aluminum oxide, awaruite, barium carbonate, barium oxide, calcium carbonate, calcium oxide, chromite, chromium oxide, copper, copper oxide, dolomite, galena, gold, hematite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, pumice, pyrite, scheelite, silver, tenorite, titania, titanium (II) oxide, titanium (III) oxide, zirconium oxide, zirconium silicate, zinc oxide and any combination thereof Statement 7. The method of any of the preceding statements, wherein the particulate bridging agent comprises a hollow glass sphere.

Statement 8. The method of any of the preceding statements, wherein the particulate bridging agent comprises silica flour.

Statement 9. The method of any of the preceding statements, wherein a particle size distribution of the particulate bridging agent is multi-modal.

Statement 10. The method of any of the preceding statements, wherein a D90 of the particulate bridging agent is from about 1 micron to about 2000 microns.

Statement 11. The method of any of the preceding statements, wherein a D90 of the particulate bridging agent is from about 10 microns to about 200 microns.

Statement 12. The method of any of the preceding statements, wherein the particulate bridging agent is included in the resin treatment fluid in an amount of from about 0.1% to about 60% by weight of the resin treatment fluid.

Statement 13. The method of any of the preceding statements, wherein the particulate bridging agent is included in the resin treatment fluid in an amount of from about 1% to about 20% by weight of the resin treatment fluid.

Statement 14. The method of any of the preceding statements, wherein the production equipment comprises a production packer.

Statement 15. The method of any of the preceding statements, wherein the annular space is further bounded by a face of a wellbore wall.

Statement 16. The method of statement 15, wherein the face of the wellbore wall comprises an inner diameter of a casing.

Statement 17. A method comprising: pumping a resin treatment fluid with pumping equipment into an annular space at a rate of about 0.1 to about 2 barrels per minute, wherein the resin treatment fluid comprises a liquid hardenable resin, a hardening agent, and a particulate bridging agent, wherein the resin treatment fluid gravity settles in the annular space to contact a production packer in the annular space such that at least a portion of the particulate bridging agent bridges across one or more damaged sections of the production packer, and wherein at least a portion of the liquid hardenable resin sets to form a hardened mass to seal the one or more damaged sections.

Statement 18. The method of statement 17, wherein the face of the wellbore wall comprises an inner diameter of a casing.

Statement 19. The method of statement 17 or 18, wherein a D90 of the particulate bridging agent is from about 10 microns to about 200 microns.

Statement 20. The method of any of the preceding statements, wherein a particle size distribution of the particulate bridging agent is multi-modal.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:
    pumping a resin treatment fluid from a surface location to an annular space bounded by an outer diameter of a production tubular,
    wherein the resin treatment fluid comprises a liquid hardenable resin, a hardening agent, and a particulate bridging agent, wherein an average size distribution of the particulate bridging agent is multi-modal,
    wherein the resin treatment fluid gravity settles in the annular space to contact production equipment in the annular space such that at least a portion of the particulate bridging agent bridges across one or more damaged sections of the production equipment, and
    wherein at least a portion of the liquid hardenable resin sets to form a hardened mass to seal the one or more damaged sections.

2. The method of claim 1, wherein the resin treatment fluid is pumped at an injection rate of about 0.1 to about 2 barrels per minute.

3. The method of claim 1, wherein a volume of about 5 bbls or less of the resin treatment fluid is introduced into the annular space.

4. The method of claim 1, wherein the resin treatment fluid gravity settles over a period of about 30 minutes to about 2 hours.

5. The method of claim 1, wherein the liquid hardenable resin comprises at least one resin selected from the group consisting of an epoxy-based resin, novolak resin, polyepoxide resin, phenol-aldehyde resin, urea-aldehyde resin, urethane resin, phenolic resin, furan resin, furan/furfuryl alcohol resin, phenolic/latex resin, phenol formaldehyde resin, bisphenol A diglycidyl ether resin, butoxymethyl butyl glycidyl ether resin, bisphenol A-epichlorohydrin resin, bisphenol F resin, diglycidyl ether bisphenol F resin, cyclohexane dimethanol diglycidyl ether, glycidyl ether resin, polyester resin and a hybrid and copolymer thereof, polyurethane resin and a hybrid and copolymer thereof, acrylate resin, and any combination thereof.

6. The method of claim 1, wherein the particulate bridging agent comprises at least one particulate material selected from the group consisting of sand, silica, alumina, fumed carbon, carbon black, graphite, mica, titanium dioxide, meta-silicate, calcium silicate, kaolin, talc, zirconia, boron, fly ash, shale, ground marble, bauxite, a ceramic material, a glass material, a metal pellet, a synthetic fiber, a cellulose flake, wood, a polytetrafluoroethylene material, a nut shell piece, a cured resinous particulate, a seed shell piece, a fruit pit piece, a composite particulate, a hollow microsphere, a silica and alumina cenosphere, a hollow glass microsphere, a ceramic microsphere, a polymeric microsphere, a plastic microsphere, ilmenite, barite, Portland cement, crystalline hematite, aluminum oxide, awaruite, barium carbonate, barium oxide, calcium carbonate, calcium oxide, chromite, chromium oxide, copper, copper oxide, dolomite, galena, gold, hematite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, pumice, pyrite, scheelite, silver, tenorite, titania, titanium (II) oxide, titanium (III) oxide, zirconium oxide, zirconium silicate, zinc oxide and any combination thereof.

7. The method of claim 1, wherein the particulate bridging agent comprises a hollow glass sphere.

8. The method of claim 1, wherein the particulate bridging agent comprises silica flour.

9. The method of claim 1, wherein a D90 of the particulate bridging agent is from about 1 micron to about 2000 microns.

10. The method of claim 1, wherein a D90 of the particulate bridging agent is from about 10 microns to about 200 microns.

11. The method of claim 1, wherein the particulate bridging agent is included in the resin treatment fluid in an amount of from about 0.1% to about 60% by weight of the resin treatment fluid.

12. The method of claim 1, wherein the particulate bridging agent is included in the resin treatment fluid in an amount of from about 1% to about 20% by weight of the resin treatment fluid.

13. The method of claim 1, wherein the production equipment comprises a production packer.

14. The method of claim 1, wherein the annular space is further bounded by a face of a wellbore wall.

15. The method of claim 14, wherein the face of the wellbore wall comprises an inner diameter of a casing.

16. A method comprising:
pumping a resin treatment fluid with pumping equipment into an annular space at a rate of about 0.1 to about 2 barrels per minute, wherein the annular space is bounded by an outer diameter of a production tubular and a face of a wellbore wall,
wherein the resin treatment fluid comprises a liquid hardenable resin, a hardening agent, and a particulate bridging agent, wherein an average size distribution of the particulate bridging agent is multi-modal,
wherein the resin treatment fluid gravity settles in the annular space to contact a production packer in the annular space such that at least a portion of the particulate bridging agent bridges across one or more damaged sections of the production packer, and
wherein at least a portion of the liquid hardenable resin sets to form a hardened mass to seal the one or more damaged sections.

17. The method of claim 16, wherein the face of the wellbore wall comprises an inner diameter of a casing.

18. The method of claim 16, wherein a D90 of the particulate bridging agent is from about 10 microns to about 200 microns.

19. The method of claim 16, wherein the liquid hardenable resin comprises at least one resin selected from the group consisting of an epoxy-based resin, novolak resin, polyepoxide resin, phenol-aldehyde resin, urea-aldehyde resin, urethane resin, phenolic resin, furan resin, furan/furfuryl alcohol resin, phenolic/latex resin, phenol formaldehyde resin, bisphenol A diglycidyl ether resin, butoxymethyl butyl glycidyl ether resin, bisphenol A-epichlorohydrin resin, bisphenol F resin, diglycidyl ether bisphenol F resin, cyclohexane dimethanol diglycidyl ether, glycidyl ether resin, polyester resin and a hybrid and copolymer thereof, polyurethane resin and a hybrid and copolymer thereof, acrylate resin, and any combination thereof.

20. The method of claim 16, wherein the particulate bridging agent comprises at least one particulate material selected from the group consisting of sand, silica, alumina, fumed carbon, carbon black, graphite, mica, titanium dioxide, meta-silicate, calcium silicate, kaolin, talc, zirconia, boron, fly ash, shale, ground marble, bauxite, a ceramic material, a glass material, a metal pellet, a synthetic fiber, a cellulose flake, wood, a polytetrafluoroethylene material, a nut shell piece, a cured resinous particulate, a seed shell piece, a fruit pit piece, a composite particulate, a hollow microsphere, a silica and alumina cenosphere, a hollow glass microsphere, a ceramic microsphere, a polymeric microsphere, a plastic microsphere, ilmenite, barite, Portland cement, crystalline hematite, aluminum oxide, awaruite, barium carbonate, barium oxide, calcium carbonate, calcium oxide, chromite, chromium oxide, copper, copper oxide, dolomite, galena, gold, hematite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, pumice, pyrite, scheelite, silver, tenorite, titania, titanium (II) oxide, titanium (III) oxide, zirconium oxide, zirconium silicate, zinc oxide and any combination thereof.

\* \* \* \* \*